(12) United States Patent
Nedzlek

(10) Patent No.: US 8,596,938 B2
(45) Date of Patent: Dec. 3, 2013

(54) BACKBORE TOOL WITH COOLANT ACTUATION

(75) Inventor: Kevin Nedzlek, Howell, MI (US)

(73) Assignee: Valenite LLC, Madison Heights, MI (US)

( * ) Notice: Subject to any disclaimer, the term of this patent is extended or adjusted under 35 U.S.C. 154(b) by 1173 days.

(21) Appl. No.: 12/504,979

(22) Filed: Jul. 17, 2009

(65) Prior Publication Data

US 2010/0014933 A1  Jan. 21, 2010

Related U.S. Application Data

(60) Provisional application No. 61/081,779, filed on Jul. 18, 2008.

(51) Int. Cl.
*B23B 29/034* (2006.01)

(52) U.S. Cl.
USPC .......................... 408/159; 408/1 R; 408/180

(58) Field of Classification Search
USPC .................................. 408/1 R, 158, 159, 180
IPC ........................................................ B23B 29/34
See application file for complete search history.

(56) References Cited

U.S. PATENT DOCUMENTS

| | | | | |
|---|---|---|---|---|
| 2,945,426 A | * | 7/1960 | Buchan | 408/187 |
| 3,019,712 A | * | 2/1962 | Winberry, Jr. | 408/187 |
| 3,530,745 A | | 9/1970 | Milewski | |
| 3,806,271 A | | 4/1974 | Ishiguro et al. | |
| 3,827,821 A | * | 8/1974 | Swenson | 408/59 |
| 4,307,636 A | * | 12/1981 | Lacey | 82/1.5 |
| 4,411,324 A | * | 10/1983 | Liebig | 175/289 |
| 4,547,100 A | | 10/1985 | Naccarato et al. | |
| 4,586,573 A | * | 5/1986 | Jones | 175/285 |
| 4,654,957 A | | 4/1987 | Powell et al. | |
| 4,729,699 A | * | 3/1988 | Frazzoli | 408/152 |

(Continued)

FOREIGN PATENT DOCUMENTS

| | | |
|---|---|---|
| EP | 1 123 766 | 8/2001 |
| JP | 62-295211 | 12/1987 |

(Continued)

OTHER PUBLICATIONS

English Translation of JP 07009207 A.*

(Continued)

*Primary Examiner* — David Bryant
*Assistant Examiner* — Jason L Vaughan
(74) *Attorney, Agent, or Firm* — Morgan, Lewis & Bockius LLP

(57) ABSTRACT

A material removal tool with a cutting insert mounted in the seating pocket is disclosed. The translating bar is operably connected to the at least one radially pivotable arm by a mechanical linkage and translates under fluid pressure applied to one side of a piston head by an actuating fluid, where the actuating fluid is also coolant for the material removal tool. With the translating bar in a first position, the radially outermost edge of the cutting insert is radially inward from the first active volume, and with the translating bar in a second position, the radially outermost portion of the cutting insert is radially outward from the first active volume and the axially rearmost portion of the cutting insert is rearward of an axially rearmost portion of the arm. A method of removing material from a workpiece with the material removal tool, such as by backboring, is also disclosed.

26 Claims, 6 Drawing Sheets

(56) References Cited

U.S. PATENT DOCUMENTS

| | | | |
|---|---|---|---|
| 4,867,619 A | | 9/1989 | Briggs |
| 4,941,782 A | | 7/1990 | Cook |
| 4,992,010 A | * | 2/1991 | Fischer .................. 408/159 |
| 5,316,417 A | | 5/1994 | Romi |
| 5,848,860 A | | 12/1998 | Steiner |
| 5,927,911 A | | 7/1999 | Steiner |
| 6,013,016 A | | 1/2000 | Irvine et al. |
| 6,394,710 B1 | | 5/2002 | Kurz |
| 6,402,440 B2 | | 6/2002 | Soma |
| 6,648,562 B1 | * | 11/2003 | Calkins et al. ............. 408/67 |
| 6,846,136 B2 | | 1/2005 | Brock et al. |
| 2007/0245535 A1 | | 10/2007 | Noggle |
| 2008/0298914 A1 | | 12/2008 | Nedzlek |

FOREIGN PATENT DOCUMENTS

| | | | |
|---|---|---|---|
| JP | 1-101708 | | 7/1989 |
| JP | 04360702 A | * | 12/1992 |
| JP | 07009207 A | * | 1/1995 |
| JP | 2002-307216 | | 10/2002 |

OTHER PUBLICATIONS

English Translation of JP 07009207 A—Retrieved from JPO on Dec. 11, 2012 and filed Jan. 10, 2013.*

Supplementary European Search Report for 09798697.0, dated Dec. 1, 2011.

* cited by examiner

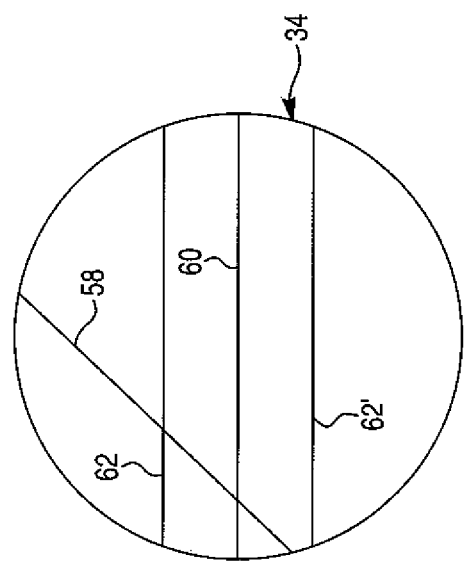

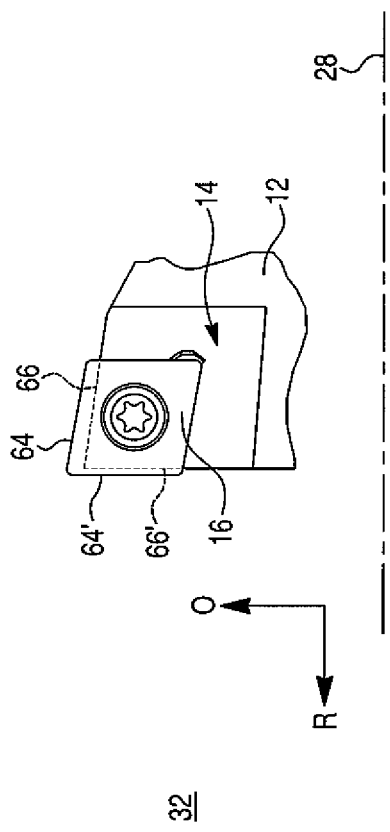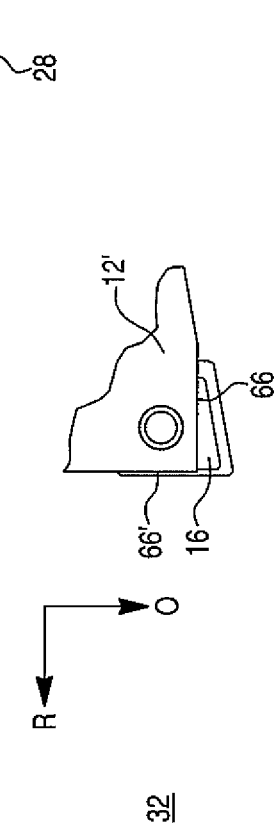

BACKBORE TOOL WITH COOLANT ACTUATION

RELATED APPLICATION DATA

This application claims priority under 35 U.S.C. §119(e) to U.S. Provisional Application No. 61/081,779, filed Jul. 18, 2008, the entire contents of which are incorporated herein by reference.

FIELD

The present disclosure relates to rotateable cutting tools having at least one cutting element the position of which relative to the tool is adjustable. More particularly, the present disclosure is related to a material removal tool with a linkage moveable to change the position of at least one cutting element relative to the tool, especially a tool for backboring.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Known rotateable tools comprising position adjustable cutting elements use various means for effecting changes of position of the cutting elements, including mechanical actuators, hydraulics and pneumatic pressure. Typically, the actuation device, such as a translating bar internal to the rotateable tool, was precisely fitted and had high friction surfaces, requiring high mechanically-generated or fluid-generated forces for actuation movement. In other instances, forces generated by reverse rotation of the spindle "flip" a cutting insert from a retracted position to an extended position, e.g., under centrifugal force.

Examples of known rotateable tools with position adjustable cutting elements are EP Patent Application No. 1123766, Japanese Utility Model Application No. 62-201231 and U.S. Pat. Nos. 4,941,782, 6,394,710 and 6,846,136.

SUMMARY

An exemplary material removal tool comprises a housing body, a translating bar, at least a portion of the translating bar internal to the housing body and axially translatable from a first position to a second position, at least one radially pivotable arm, the arm including at least one seating pocket, and a cutting insert mounted in the seating pocket, wherein the translating bar is operably connected to the at least one radially pivotable arm by a mechanical linkage, wherein the housing body is divided into a mounting portion and an active portion, the mounting portion including a connector at a mating end and the active portion including the at least one radially pivotable arm and having a first active volume, wherein, with the translating bar in the first position, the radially outermost edge of the cutting insert is radially inward from the first active volume, and wherein, with the translating bar in the second position, the radially outermost portion of the cutting insert is radially outward from the first active volume and the axially rearmost portion of the cutting insert is rearward of an axially rearmost portion of the arm.

An exemplary method for removing material from a workpiece with a rotating material removal tool comprises axially translating a translating bar of the material removal tool in a first direction to position a radially outermost edge of a cutting insert radially inward from a first active volume of an active portion of the housing body of the material removal tool, the cutting insert seated in a seating pocket on a radially pivotable arm in the active portion of the housing body, inserting the active portion into a bore in the workpiece, axially translating the translating bar of the material removal tool in a second direction to position the radially outermost edge radially outward from the first active volume and to position an axially rearmost portion of the cutting insert axially rearward of the radially pivotable arm, and rotating the rotating material removal tool while contacting the workpiece with the cutting insert, wherein the material removal tool includes a housing body, at least a portion of the translating bar internal to the housing body, and wherein the translating bar is operably connected to the radially pivotable arm by a mechanical linkage.

An exemplary material removal tool comprises a housing body, a piston head in an actuating chamber internal to the housing body, a translating bar, and at least one radially pivotable arm, the arm including at least one seating pocket, wherein the translating bar includes a first end operably connected to the piston head to axially translate between a first position and a second position when the piston head translates, wherein the translating bar includes a second end operably connected to the at least one radially pivotable arm by a mechanical linkage, wherein the housing body is divided into a mounting portion and an active portion, the mounting portion including a connector at a mating end and the active portion including the at least one radially pivotable arm and having a first active volume, wherein in the first position, the radially outermost edge of the seating pocket is radially inward from the first active volume, wherein in the second position, the radially outermost portion of the arm is the radially outermost edge of the seating pocket and is radially outward from the first active volume, and wherein in the second position, the axially rearmost portion of the arm is the axially rearmost edge of the seating pocket.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which:

FIG. 3 illustrates example locations for a pivot axis of the radially pivotable arms.

FIGS. 4A and 4B show magnified views of a cutting insert seated in a seating pocket of an exemplary embodiment of a radially pivotable arm. FIG. 4A shows the view from a front side and FIG. 4B shows the view from a rear side of the radially pivotable arm.

DETAILED DESCRIPTION

Figure 1:
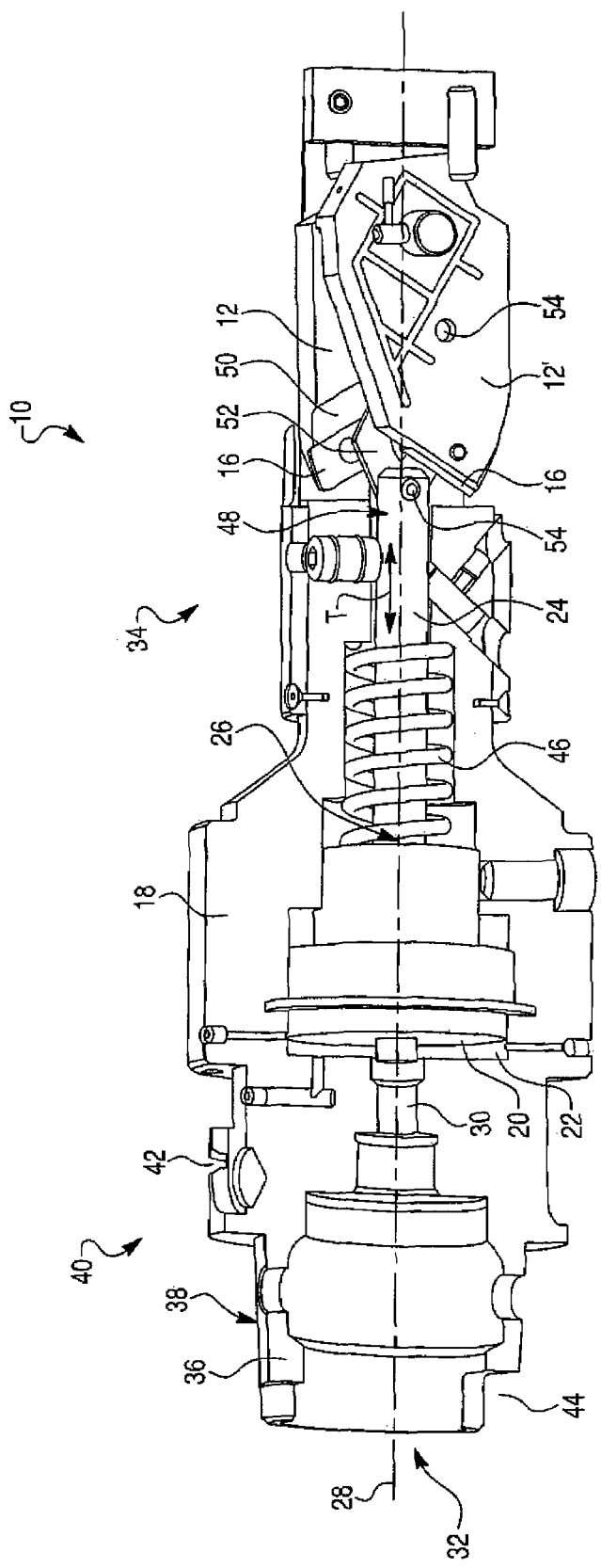
FIG. 1 is a cross-sectional schematic drawing of an exemplary embodiment of a material removal tool with arms in a retracted position.
Figure 2:
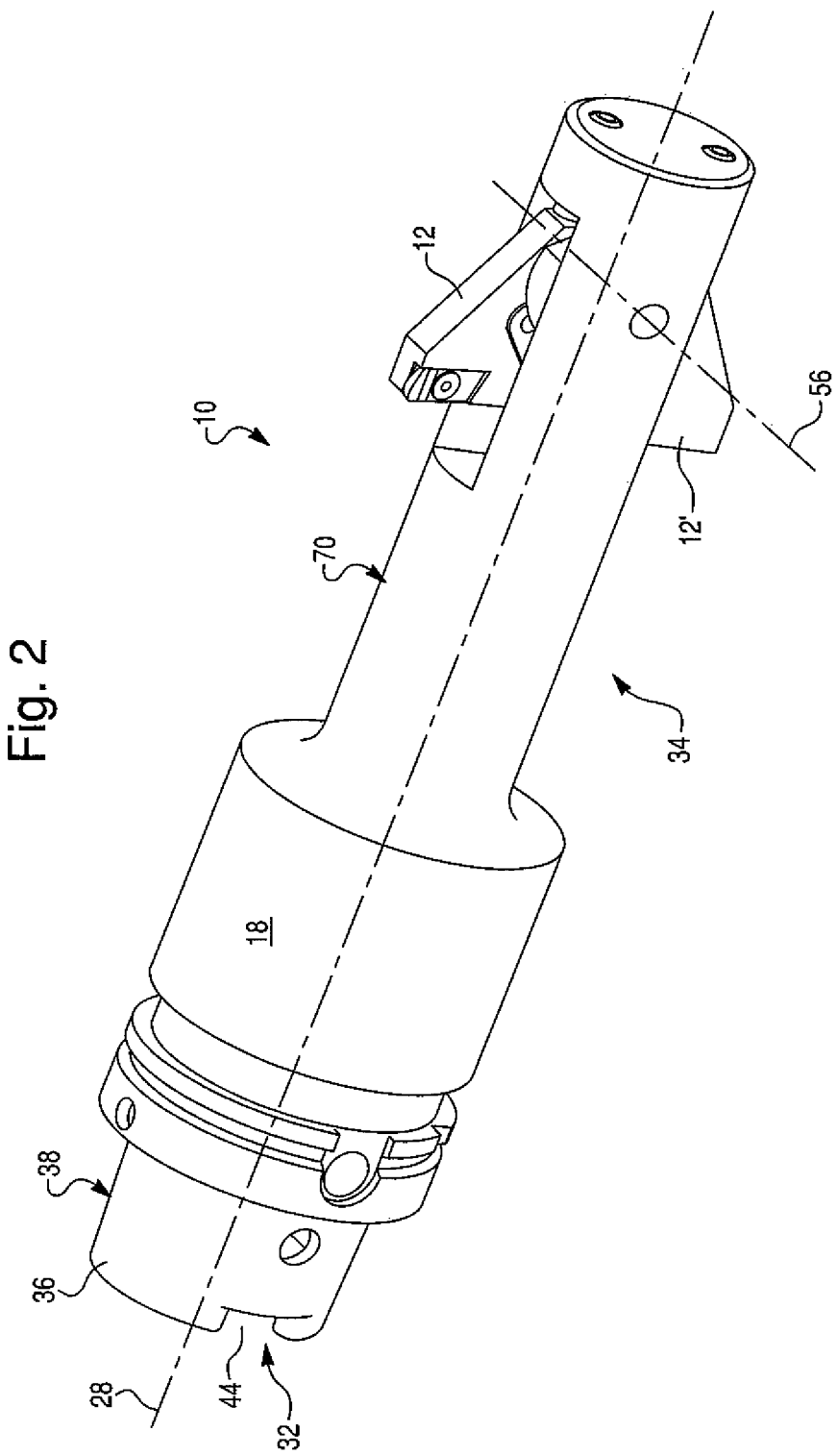
FIG. 2 is a schematic drawing of the exemplary embodiment of a material removal tool shown in FIG. 1 with arms in an extended position.

Exemplary embodiments of a material removal tool includes cutting inserts mounted in respective seating pockets on at least one radially pivotable arm that is located in an active portion of the material removal tool. The arms are pivotably retracted into the housing to allow insertion into a bore in a workpiece and then are pivoted outward, by movement of a mechanically linked translating bar, to position the cutting inserts for material removal operations, such as backboring. FIG. 1 is a cross-sectional schematic drawing of an exemplary embodiment of a material removal tool 10 with arms 12 in a retracted position. FIG. 2 is a schematic drawing of the exemplary embodiment of a material removal tool shown in FIG. 1 with arms in an extended position.

As shown in FIG. 1, the material removal tool 10 comprises at least one radially pivotable arm 12. The arm 12 includes at least one seating pocket 14 for receiving a cutting insert 16. The material removal tool 10 has a housing body 18. A piston head 20 is internally located in an actuating chamber 22 and at least a portion of a translating bar 24, alternatively substantially all of the translating bar, is also internally located in the housing body 18. The translating bar 24 at a first end 26 is operably connected to the piston head 20 to axially, reversibly translate (T) along a first axis 28 between a first position and a second position when the piston head 20 translates.

The translating bar 24 can be connected to the piston head 20 by any suitable means, such as, for example, a guide pin. The piston head 20 translates under fluid pressure applied to one side of the piston head 20 by an actuating fluid. The actuating fluid can be a liquid or a gas. Actuating fluid is supplied to one side of the piston head 20 via one or more supply passages 30 in the housing body 18. In an exemplary embodiment, the supply passages 30 communicate with one or more passages at a mating end 32 of the material removal tool 10, which themselves communicate with passages on the spindle of the machine tool to supply actuating fluid, such as coolant from the reservoir of coolant for the machine tool. Typically, the actuating fluid is supplied above the piston head 20 at a pressure to overcome forces generated by the biasing element 46. On an opposite side of the piston head 20 from the actuating fluid supply side are located one or more smaller return passages to carry actuating fluid through the material removal tool 10 to provide cooling. The differential sizes between the supply passages and the return passages creates a backpressure and a differential pressure across the piston head 20 to translate the piston head 20 and the translating bar 24. When the coolant of the machine tool is turned off, the pressure in the actuating fluid bleeds off and the biasing element repositions the piston head 20. In an exemplary embodiment, the unpressurized position of the piston head 20 positions the arms 12,12' in a retracted position.

When mounted on a machine tool, the mating end 32 is proximal to the machine tool to which it is attached, typically to a spindle, and an active portion 34 is at a distal end relative to the machine tool.

A connector 36 at the mating end 32 of the material removal tool 10 attaches to the machine tool, such as a HAAS VF6 milling machine, for operation. The connector 36 can take any suitable form that allows attachment to a desired machine tool. In an exemplary embodiment, the connector 36 has a tapered surface 38, for example, tapered rearward or toward the proximal end. A transition piece 40 can optionally be included with the connector 36. An example of a transition piece 40 includes at least one feature for mating to a machine tool or to a storage system. For example, the transition piece 40 can include a circumferential groove 42. The circumferential groove 42, or similar structure, can provide an attachment point for mating the material removal tool 10 to a carousel storage system used in machining operations to store multiple material removal tools. In another example, the transition piece 40 or connector 36 can include a key slot 44. The key slot 44, or similar structure, can provide an orientation or a mating with a corresponding feature on the machine tool when the material removal tool is mounted for use.

Also shown in FIGS. 1 and 2 are other features including various openings, connectors and manipulators for assembly and operation of the material removal tool 10.

At pressure, the actuating fluid above the piston head 20 overcomes a biasing force, such as the biasing force of a biasing element 46. Examples of biasing elements include mechanical systems, such as springs, dashpots, pistons and bellows, elastic materials, and non-mechanical systems, such as compressible fluids and compressible gases. Biasing can be accomplished by any desired technique. For example, a mechanical biasing element, such as a spring, can be used. In exemplary embodiments, the biasing element is preloaded to exert a force to bias the piston head 20 toward the mating end 32 of the material removal tool 10, although the opposite arrangement can also be constructed.

The translating bar 24 includes a second end 48 operably connected to the at least one radially pivotable arm 12 by a mechanical linkage 50. An example of a mechanical linkage 50 is a series or links 52 joined at pivot points 54. The mechanical linkage 50 can optionally include slideable grooves or other slots that may be regular or eccentric, depending on the movement desired by the actuation of the mechanical linkage 50, and associated pins or posts that cooperate to guide radial pivoting movement of the arms 12 when the translating bar 24 axially translates.

Exemplary embodiments of the material removal tool 10 can optionally comprise two radially pivotable arms 12,12', such as shown in FIGS. 1 and 2, each arm including at least one seating pocket 14. In some exemplary embodiments, the two radially pivotable arms 12,12' pivot about a pivot axis 56. For example, the pivot axis 56 can be commonly located on a chord 58 of the cross-section of the material removal tool 10, alternatively commonly located on a diameter 60 of the cross-section of the material removal tool, in the active portion 32. In other exemplary embodiments, the two radially pivotable arms 12,12' pivot about offset pivot axes 62,62'. In either embodiment, the radially pivotable arms are positioned to pivot radially, i.e., to project radially relative to the first axis 28 of the material removal tool 10. FIG. 3 illustrates example locations for a pivot axis 56 of the radially pivotable arms 12,12', showing the chord 58, diameter 60 and offset pivot axes 62,62' in a hypothetical cross-section of the active portion 34 of the material removal tool. Using offset pivot axes 62,62' allows for two radially pivotable arms 12,12', if present, optionally pivot independently about its respective pivot axis.

The radially pivotable arm(s) 12 include at least one seating pocket 14 for receiving a cutting insert 16. Suitable cutting inserts can be of any type, e.g., facing, turning, boring. One exemplary embodiment of suitable cutting inserts is the side locking insert disclosed in U.S. application Ser. No. 11/409,089, entitled "Side Locking Insert and Material Removal Tool with Same," filed Apr. 24, 2006, the entire contents of which are incorporated herein by reference. FIG. 4A shows a magnified view of a cutting insert 16 seated in a seating pocket 14 of an exemplary embodiment of a radially pivotable arm 12 from a front side of the radially pivotable arm. When mounted in the seating pocket 14, at least portions of two adjoining cutting edges 64,64' of the insert 16 extend past corresponding edges 66,66' of the seating pocket 14. In optional embodiments, the corresponding edges 66,66' of the seating pocket 14 are the radially outermost edge and an axially rearmost edge. FIG. 4B show the magnified view of a cutting insert seated in a seating pocket of an exemplary embodiment of a radially pivotable arm from a rear side. The radially outermost direction has a radial component relative to the first axis 28, although perpendicularity is not required, and with outermost being away from the first axis 28. The axially rearmost direction has an axial component relative to the first axis 28, although parallelism is not required, and with rearward being toward the mating end 32. FIGS. 4A and 4B show examples of the directions radially outermost O and axially rearmost R. In FIGS. 4A and 4B, the first axis 28 and the mating end 32 and the relative location of each are shown conceptually.

Turning again to the translating bar, exemplary embodiments of the translating bar 24 axially, reversibly translate (T) along the first axis 28 between a first position and a second position to change the radial position of the radially pivotable arm(s) 12,12'.

In the first position, a radially outermost edge of the seating pocket, or alternatively a radially outermost surface of a cutting insert 16 when one is present in the seating pocket 14, is radially inward from a surface 70 of the active portion 34 of the material removal tool 10. The active portion of the material removal tool is that portion that contains surfaces and cutting features that penetrate into the working space around a workpiece or for which one has to consider the location when moving the material removal tool, such as by a computerized positioning system of a machine tool, to avoid non-cutting contact between the workpiece and the material removal tool. Therefore, in the first position, the cutting insert 16 seated in the pocket on the radially pivotable arm(s) 12,12' is not the most radially outwardly positioned feature. Rather, based on a circumference of the active portion at a location of a feature in the active portion having the greatest radius, an active volume can be determined. The cutting insert seated in the pocket on the radially pivotable arm(s) 12,12' would be radially inward of the surface of the this active volume.

Figure 5:
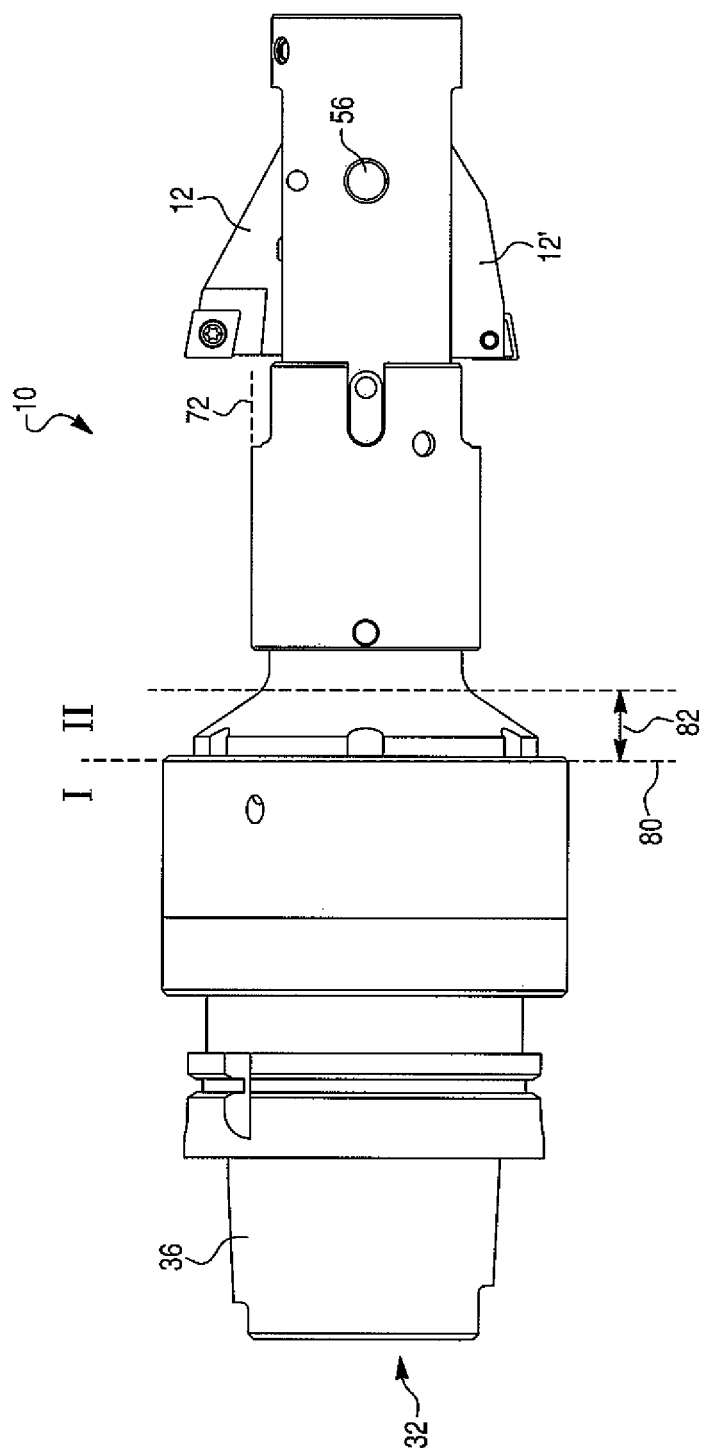
FIG. 5 is a schematic drawing of another exemplary embodiment of a material removal tool with arms in an extended position.

When determining the active portion 34 and the active volume, the surface 70 of the housing body in the active portion is considered. When the surface of the housing body in the active portion is irregular or non-uniform in radius, then surface projection 72 is considered. As an example, FIG. 1 shows a first example of an active portion and FIG. 5 shows a second example of an active portion. In FIG. 5, a portion of the surface projection 72 of the active portion 34 is illustrated.

In the second position, a radially outermost portion of arm 12 is radially outward from a surface 70 of the active portion 34 of the material removal tool 10. In exemplary embodiments, the radially outermost portion of the arm 12 is the radially outermost edge of the seating pocket 14 and is radially outward from the first active volume. Also in the second position, the axially rearmost portion of the arm 12 is the axially rearmost edge of the seating pocket 14. When a cutting insert 16 is present in the seating pocket 14, the radially outermost portion of the cutting insert 16 is radially outward from the first active volume, alternatively the radially outermost portion of the cutting insert 16 is radially outward of a radially outermost portion of the arm 12, and an axially rearmost portion of the cutting insert 16 is rearward of an axially rearmost portion of the arm 12.

Therefore, in the second position, the axially rearmost cutting edge of the cutting insert seated in the pocket on the arm or the radially outermost cutting edge of the cutting insert seated in the pocket on the arm, or a combination of both contacts the workpiece and removes material during operation. For backboring operations, only the axially rearmost cutting edge of the cutting insert seated in the pocket on the arm contacts the workpiece and removes material during operation.

In some exemplary embodiments and as shown in FIG. 5, the material removal tool 10 can be generally described as having an active portion and a mounting portion. For example the housing body 18 can be divided into a mounting portion (I) and an active portion (II). The mounting portion includes the connector 36 at the mating end 32 and the active portion includes the at least one radially pivotable arm 12. When present, the two radially pivotable arms 12,12' are both located in the active portion (II), which has an associated first active volume. The active portion of the material removal tool 10 is separated from the rearward portions of the material removal tool 10 by a transition line 80. When determining the radially outermost surface of the active portion 34, those surfaces forward of the transition line 80 are considered, although any change in radius of the active portion 34 in a transition region 82 about the transition line 80 and between the active portion 34 and the next rearward portion can optionally not be considered.

In view of the above discussions of active volume, one can appreciate that the different combinations of (a) retracted radially pivotable arms, (b) extended radially pivotable arms and (c) independently extended radially pivotable arms which can be used with the material removal tool calls for a determination of active volume for each combination of positions of the radially pivotable arms.

Figure 6:
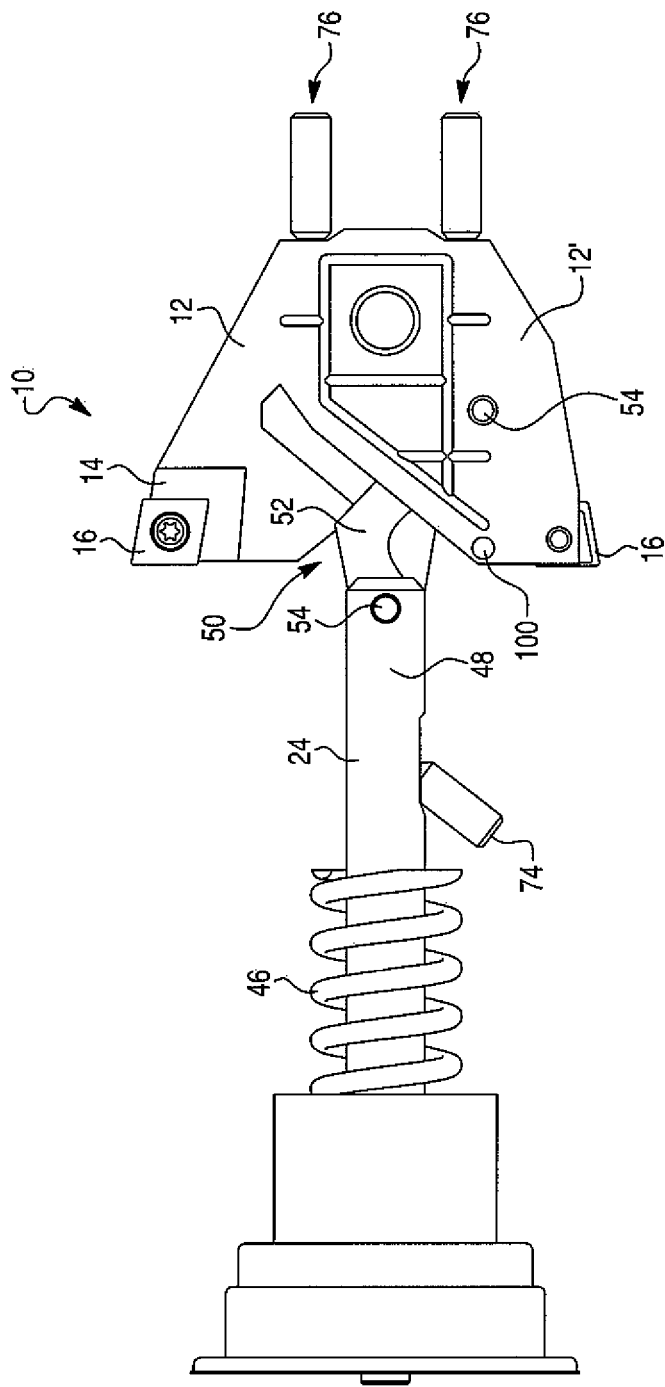
FIG. 6 is a schematic drawing of the exemplary embodiment of a material removal tool shown in FIG. 5 with arms in an extended position and showing the internal linkages.

FIG. 6 is a schematic drawing of the exemplary embodiment of a material removal tool shown in FIG. 5 with radially pivotable arms 12,12' in an extended position. In FIG. 6, some of the visible features include the translating bar 24, the linkages 50, the biasing element 46 in the form of a spring, and radially pivotable arms 12,12'. In the FIG. 6 embodiment, the biasing element 46 is biased in a rearward direction, but other biasing directions may be used.

Also as seen in FIG. 6, the material removal tool 10 includes features that limit the axial translation (T) of the translating bar 24. For example, in the first position, the translating bar 24 contacts a rearward delimiting device 74. Also for example, in the second position, the translating bar 24 moves at least one radially pivotable arm 12,12' to contact a forward delimiting device 76. An example of a forward delimiting device is an adjustable positive stop. By adjusting the adjustable delimiting device, the radial distance that the arms 12,12' pivot can be adjusted. Typically, the working diameter and/or the perpendicularity to face of the tool is preset, e.g., by adjusting forward delimiting device 76.

Various methods can be used to remove material from a workpiece with the material removal tools disclosed herein.

For example, in one exemplary embodiment of a method for removing material from a workpiece with a rotating material removal tool, the method comprises axially translating a translating bar of the material removal tool in a first direction to position a radially outermost edge of a cutting insert radially inward from a first active volume of an active portion of the housing body of the material removal tool. In this instance, the cutting inserts are seated in a seating pocket on a radially pivotable arm in the active portion of the housing body. The active portion of the material removal tool is then inserted into a bore in the workpiece. For example, a bore having an opening with a radius R can accommodate a bore having a radius of the active portion that is less than R. Therefore, the radially pivotable arms and/or the cutting inserts mounted thereon, are retracted to a radius of less than R and inserted into the opening of the bore. A support device, such as a bushing on the front circumferential surface of the active portion can be placed into a receiving location within the bore for support at the distal end.

Subsequent to insertion into the bore, the translating bar of the material removal tool is axially translated in a second direction to position the radially outermost edge radially outward from the first active volume and to position an axially rearmost portion of the cutting insert axially rearward of the radially pivotable arm. In this position, substantially exhibited in FIGS. 2 and 6, the axially rearmost portion of the cutting insert can participate in backboring operations and/or the radially outermost portion of the cutting insert can participate in facing operations. Whether the axially rearmost portion of the cutting insert and/or the radially outermost portion of the cutting insert contact a working surface of the workpiece, the method rotates the rotating material removal tool about a longitudinally axis while contacting the workpiece with the cutting insert.

In alternative embodiments, the radial distance that the arms pivot, and thus the position of the cutting inserts mounted on the arms, are adjusted by manipulating a first delimiting structure. An exemplary embodiment of the first delimiting structure is the adjustable positive stop disclosed and described herein, although other suitable delimiting structures can be used.

After a desired amount of material is removed, rotation of the material removal tool stops. An axial translation of the material removal tool occurs to disengage the inserts on the radially pivotable arms from the workpiece surface and allow clearance for retracting the radially pivotable arms radially inward to a radius of less than the radius of the bore.

One can appreciate that when inserted in a workpiece, such as in a bore, one can not visibly see the position of the radially pivotable arms. Thus, when machining is finished, if the radially pivotable arms do not retract inward less than the radius of the bore, then upon extraction of the material removal tool from the bore, some portion of the arms or inserts will contact a surface of the workpiece. Some attendant problems in such a case can include prevention of extraction of the material removal tool, marking of a surface of the workpiece, perhaps sufficient to cause rejection of the finished workpiece, or breaking of the material removal tool.

To minimize the potential problems from radially pivotable arms not being fully retracted, a means for sensing a position of the radially pivotable arms can be included. For example, a means for sensing a position can sense the radially pivotable arms in a refracted position, or can sense the radially pivotable arms not in the retracted position, or can sense the radially pivotable arms in an extended position, or can sense the radially pivotable arms in an intermediate position, or a combination of these sensing conditions can be used. An example of a means for sensing can include a contact sensor or switch using mechanical contact, a proximity sensor or switch, a magnetic coupling sensor, an optical sensor, such as a LED optical sensor, or a radio frequency sensor. The inclusion of a sensor is optional, but it is particularly advantageous for unmanned and/or automated machine tool operations. FIG. 6 shows an example of a sensor, with a first element 100 on each radially pivotable arm 12,12' and a second element (not shown) in the housing 18. When the radially pivotable arms 12,12' retract, the first element 100 substantially aligns face-to-face with the second element to generate or remove a signal detectable by an operator.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A material removal tool, comprising:
   a housing body;
   a piston head in an actuating chamber internal to the housing body;
   a translating bar; and
   at least one radially pivotable arm, the arm including at least one seating pocket,
   wherein the translating bar includes a first end operably connected to the piston head to axially translate between a first position and a second position when the piston head translates,
   wherein the translating bar includes a second end operably connected to the at least one radially pivotable arm by a mechanical linkage, wherein the mechanical linkage includes a mechanical link connecting the translating bar to the at least one radially pivotable arm, the translating bar connected to the mechanical link at one pivot point and the at least one radially pivotable arm connected to the mechanical link at another pivot point,
   wherein the housing body is divided into a mounting portion and an active portion, the mounting portion including a connector at a mating end and the active portion including the at least one radially pivotable arm and having a first active volume,
   wherein in the first position, the radially outermost edge of the seating pocket is radially inward from the first active volume,
   wherein in the second position, the radially outermost portion of the arm is the radially outermost edge of the seating pocket and is radially outward from the first active volume, and
   wherein in the second position, the axially rearmost portion of the arm is the axially rearmost edge of the seating pocket.

2. The material removal tool of claim 1, wherein the first active volume is determined based on a radially outermost surface of the active portion of the material removal tool.

3. The material removal tool of claim 1, wherein a diameter of the active portion is substantially constant along an axial extent of the active portion and the first active volume is determined based on the largest diameter within the axial extent.

4. The material removal tool of claim 1, comprising two radially pivotable arms on the active portion of the material removal tool, wherein each arm includes at least one seating pocket, wherein the two radially pivotable arms pivot about a common pivot axis, and wherein the same translating bar is operably connected to both of the two radially pivotable arms.

5. The material removal tool of claim 1, wherein in the first position, the translating bar contacts a rearward delimiting device and wherein in the second position, the at least one radially pivotable arm contacts a forward delimiting device.

6. The material removal tool of claim 1, wherein the translating bar is biased in a rearward direction.

7. The material removal tool of claim 1, wherein the material removal tool is a backboring material removal tool.

8. The material removal tool of claim 1, wherein a cutting insert is mounted on in least one seating pocket.

9. The material removal tool of claim 8, wherein at least portions of two adjoining cutting edges of the insert extend past corresponding edges of the seating pocket.

10. The material removal tool of claim 9, wherein the corresponding edges of the seating pocket are the radially outermost edge and an axially rearmost edge.

11. The material removal tool of claim 1, comprising means for sensing a position of the at least one radially pivotable arm.

12. A material removal tool, comprising:
a housing body;
a translating bar, at least a portion of the translating bar internal to the housing body and axially translatable from a first position to a second position;
at least one radially pivotable arm, the arm including at least one seating pocket; and
a cutting insert mounted in the seating pocket,
wherein the translating bar is operably connected to the at least one radially pivotable arm by a mechanical linkage, wherein the mechanical linkage includes a mechanical link connecting the translating bar to the at least one radially pivotable arm, the translating bar connected to the mechanical link at one pivot point and the at least one radially pivotable arm connected to the mechanical link at another pivot point,
wherein the housing body is divided into a mounting portion and an active portion, the mounting portion including a connector at a mating end and the active portion including the at least one radially pivotable arm and having a first active volume,
wherein, with the translating bar in the first position, the radially outermost edge of the cutting insert is radially inward from the first active volume, and
wherein, with the translating bar in the second position, the radially outermost portion of the cutting insert is radially outward from the first active volume and the axially rearmost portion of the cutting insert is rearward of an axially rearmost portion of the arm.

13. The material removal tool of claim 12, comprising a piston head in an actuating chamber internal to the housing body, wherein a first end of the translating bar is operably connected to the piston head to axially translate between the first position and the second position when the piston head translates.

14. The material removal tool of claim 12, wherein the first active volume is determined based on a radially outermost surface of the active portion of the material removal tool.

15. The material removal tool of claim 12, wherein a diameter of the active portion is substantially constant along an axial extent of the active portion and the first active volume is determined based on the largest diameter within the axial extent.

16. The material removal tool of claim 12, comprising two radially pivotable arms on the active portion of the material removal tool, wherein the two radially pivotable arms pivot about a common pivot axis, and wherein the same translating bar is operably connected to both of the two radially pivotable arms.

17. The material removal tool of claim 12, wherein in the first position, the translating bar contacts a rearward delimiting device and wherein in the second position, the at least one radially pivotable arm contacts a forward delimiting device.

18. The material removal tool of claim 12, wherein the material removal tool is a backboring material removal tool.

19. The material removal tool of claim 12, wherein, with the translating bar in the second position, the radially outermost portion of the cutting insert is radially outward of a radially outermost portion of the arm.

20. The material removal tool of claim 12, comprising means for sensing a position of the at least one radially pivotable arm.

21. A method for removing material from a workpiece with a rotating material removal tool, the method comprising:
axially translating a translating bar of the material removal tool in a first direction to position a radially outermost edge of a cutting insert radially inward from a first active volume of an active portion of the housing body of the material removal tool, the cutting insert seated in a seating pocket on a radially pivotable arm in the active portion of the housing body;
inserting the active portion into a bore in the workpiece;
axially translating the translating bar of the material removal tool in a second direction to position the radially outermost edge radially outward from the first active volume and to position an axially rearmost portion of the cutting insert axially rearward of the radially pivotable arm; and
rotating the rotating material removal tool while contacting the workpiece with the cutting insert,
wherein the material removal tool includes a housing body, at least a portion of the translating bar internal to the housing body,
wherein the translating bar is operably connected to the radially pivotable arm by a mechanical linkage, and wherein the mechanical linkage includes a mechanical link connecting the translating bar to the radially pivotable arm, the translating bar connected to the mechanical link at one pivot point and the radially pivotable arm connected to the mechanical link at another pivot point.

22. The method of claim 21, wherein a diameter of the active portion is substantially constant along an axial extent of the active portion and the first active volume is determined based on the largest diameter within the axial extent.

23. The method of claim 21, comprising two radially pivotable arms on the active portion of the material removal tool, wherein the two radially pivotable arms pivot about a common pivot axis, and wherein the same translating bar is operably connected to both of the two radially pivotable arms.

24. The method of claim 21, wherein in the first position, the translating bar contacts a rearward delimiting device and wherein in the second position, the radially pivotable arm contacts a forward delimiting device.

25. The method of claim 21, wherein the material removal tool is a backboring material removal tool.

26. The method of claim 21, wherein the material removal tool includes a piston head in an actuating chamber internal to the housing body, wherein a first end of the translating bar is operably connected to the piston head to axially translate between the first position and the second position when the piston head translates.

* * * * *